United States Patent [19]
Dotter, Jr.

[11] 3,965,309
[45] June 22, 1976

[54] TEST SYSTEM FOR A T CARRIER TYPE TELEPHONE PCM COMMUNICATIONS SYSTEM

[75] Inventor: Berton E. Dotter, Jr., Belmont, Calif.

[73] Assignee: TRW Inc., Los Angeles, Calif.

[22] Filed: Jan. 14, 1975

[21] Appl. No.: 540,813

[52] U.S. Cl. .................................. 179/175.31 R
[51] Int. Cl.² ......................................... H04B 1/60
[58] Field of Search ............ 179/175.31 R, 175.3 R, 179/175.3 F, 15 AD, 15 BF

[56] References Cited
UNITED STATES PATENTS

| | | | |
|---|---|---|---|
| 3,649,777 | 3/1972 | Matsushima ............... | 179/175.31 R |
| 3,739,098 | 6/1973 | Camiciottoli et al. ...... | 179/175.31 R |
| 3,764,760 | 10/1973 | Marchini ..................... | 179/175.31 R |
| 3,770,913 | 11/1973 | Camiciottoli et al. ...... | 179/175.31 R |
| 3,842,220 | 10/1974 | Arras ......................... | 179/175.31 R |

*Primary Examiner*—Douglas W. Olms
*Attorney, Agent, or Firm*—Flehr, Hohbach, Test, Albritton & Herbert

[57] ABSTRACT

A test system for a T carrier type telephone PCM communications system converts typical trio type pulse sets to quadruple sets in order to eliminate the dc offset. Thus, the test signal can be passed through several successive spans or through marginal repeaters in a manner similar to an ordinary data signal. The trio to quadruple conversion is accomplished by a stuffing procedure which compensates for any ambiguity in the audio crossover when the initial test signal is being produced. A reconverter may be remotely actuated to test any particular span or to loopback the test signal whereby testing may be carried on at a single location for both incoming and outgoing lines.

5 Claims, 49 Drawing Figures

TEST SYSTEM FOR A T CARRIER TYPE TELEPHONE PCM COMMUNICATIONS SYSTEM

BACKGROUND OF THE INVENTION

The present invention relates to a communications system having repeater stations and more particularly, to a system for testing or evaluating such repeaters.

A type of communications system which uses repeater stations spaced at nominally 6,000 foot distances is termed a T1 pulse code modulated (PCM) carrier system and is used in the telephone industry. It is well known that on two pairs of wires such system provides 24 channels of data transmission. When a cable type transmission system is used, the conductor pairs employ repeaters to regenerate pulse code modulated signals. The repeaters are normally unattended necessitating remote testing means for routine maintenance.

Various methods have been devised for remote evaluation of repeater performance. For example, special code generators are used and test signals are transmitted over a repeater line. Such test signals contain audio frequencies and frequency selective filters located at each repeater station permit a particular repeater to be evaluated by proper choice of a test frequency. Such audio frequencies or test frequencies as will be described in detail below are generated by trio pulse groups of alternating polarity.

Advances in technology of cables has permitted increased distances over which repeaters can operate. While the distance itself between repeaters is not materially changed, it is the greater number of tandem repeaters which has been permitted to be employed which extends the effective length of the transmission system.

The test signals of the prior art, however, are not compatible with the increased quantities of repeaters through which the signal must be passed. The prior art signals tend to deteriorate when passing through each repeater. Consequently, the repeaters at the greatest distance cannot be, or are only marginally tested.

Furthermore, a typical prior art system of fault detection did not permit testing from one end of the transmission system only. Generally, while the prior art repeaters are two way transmission devices they have a combined output to a single frequency selective filter which is used for test purposes. Thus, test signals in most cases are permitted in only one direction at a time to avoid the ambiguity of two simultaneous outputs. Some modifications have been proposed. Repeaters which are now in service cannot practically be modified.

Another recent development which a test system thus far described must contend with are violation monitor and removal circuits (VMR) which are being added to PCM transmission systems to isolate errors to a single span, thus making the spans independent of each other. Such devices insure a perfectly sequential bipolar PCM signal. However, the VMR devices will also inherently modify existing test signals to make them useless for test purposes thereafter.

Objects and Summary of the Invention

It is a general object of the invention to provide an improved system for testing a pulse code modulation type communications system.

It is another object of the invention to provide a testing system as above which maintains the original test signal quality through long transmission distances and through many repeaters.

It is another object of the invention to provide a testing system as above which permits testing from a single point.

It is another object of the invention to provide a testing system which is compatible with and compensates for the effect of violation monitor removal circuits in a PCM system.

It is another object of the invention to provide a test system which requires no modification of existing PCM communications circuitry.

It is another object of the invention to provide a testing system which allows testing of more distant repeaters even through intermediate marginal repeaters.

In accordance with the above objects there is provided a pulse code modulation (PCM) type communications system repeater stations where the PCM signal is normally in a bipolar format and the repeater stations may be tested by a plurality of test signals which have relatively low frequencies compared to the PCM rate. The test signals are formed by trio sets which consists of a PCM pulse code of one polarity between two pulses of the opposite polarity. A plurality of trio sets of one type form a trio group and sequential groups of opposite types provide a base line shift in the test signal which varies in polarity at a selected one of the low frequencies. The system includes means for converting the trio sets to quadruple sets for providing a signal which is sequentially bipolar with no dc offset.

BRIEF DESCRIPTION OF THE DRAWINGS

FIGS. 11A–11I are timing diagrams useful in explaining the operation of FIGs. 9 and 10.

DETAILED DESCRIPTION OF THE PREFERRED EMBODIMENT

Referring now to both FIGS. 1 and FIGS. 2A through J, a typical telephone type pulse code modulation (PCM) carrier system is illustrated where between the spans between office 1, office 2 and the office M each has a number of repeaters 11. Only one direction of transmission is illustrated. As discussed above, in each office there is a violation monitor remover circuit (VMR) which are illustrated in office 1 and office 2.

Figure 1:
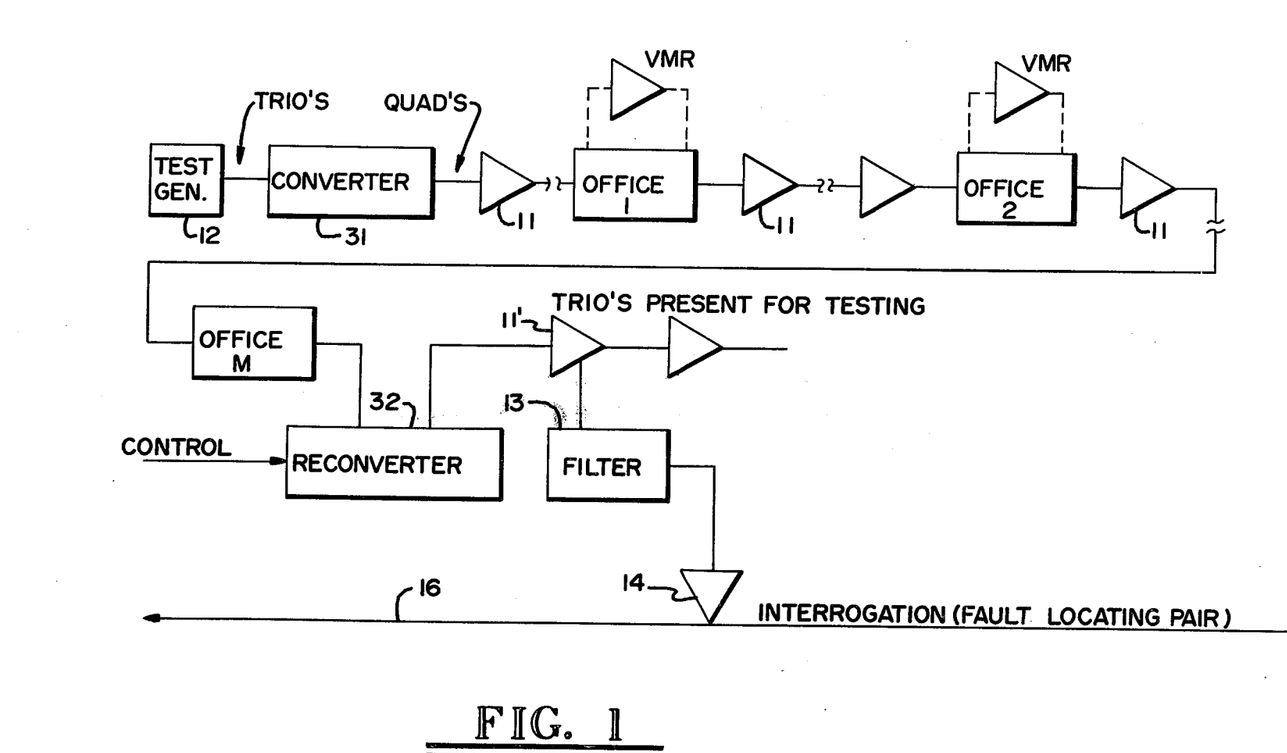
FIG. 1 is a block diagram of several spans with intervening telephone offices showing a typical application of the present invention.

These ensure that the format of the PCM signal is bipolar when transmitted through each span and its associated repeaters. As is also well-known in the prior art a test generator 12 generates trio groups of pulses which are utilized for testing. If a particular repeater such as repeater 11' is desired to be tested an audio or low frequency generated by test generator 12 must correspond to that of a filter 13, only one of which is illustrated. Such signal is amplified by amplifier 14 and transmitted back through a fault locating or interrogation pair 16 to the testing station. As thus far described the system is standard in the art.

Figure 2:
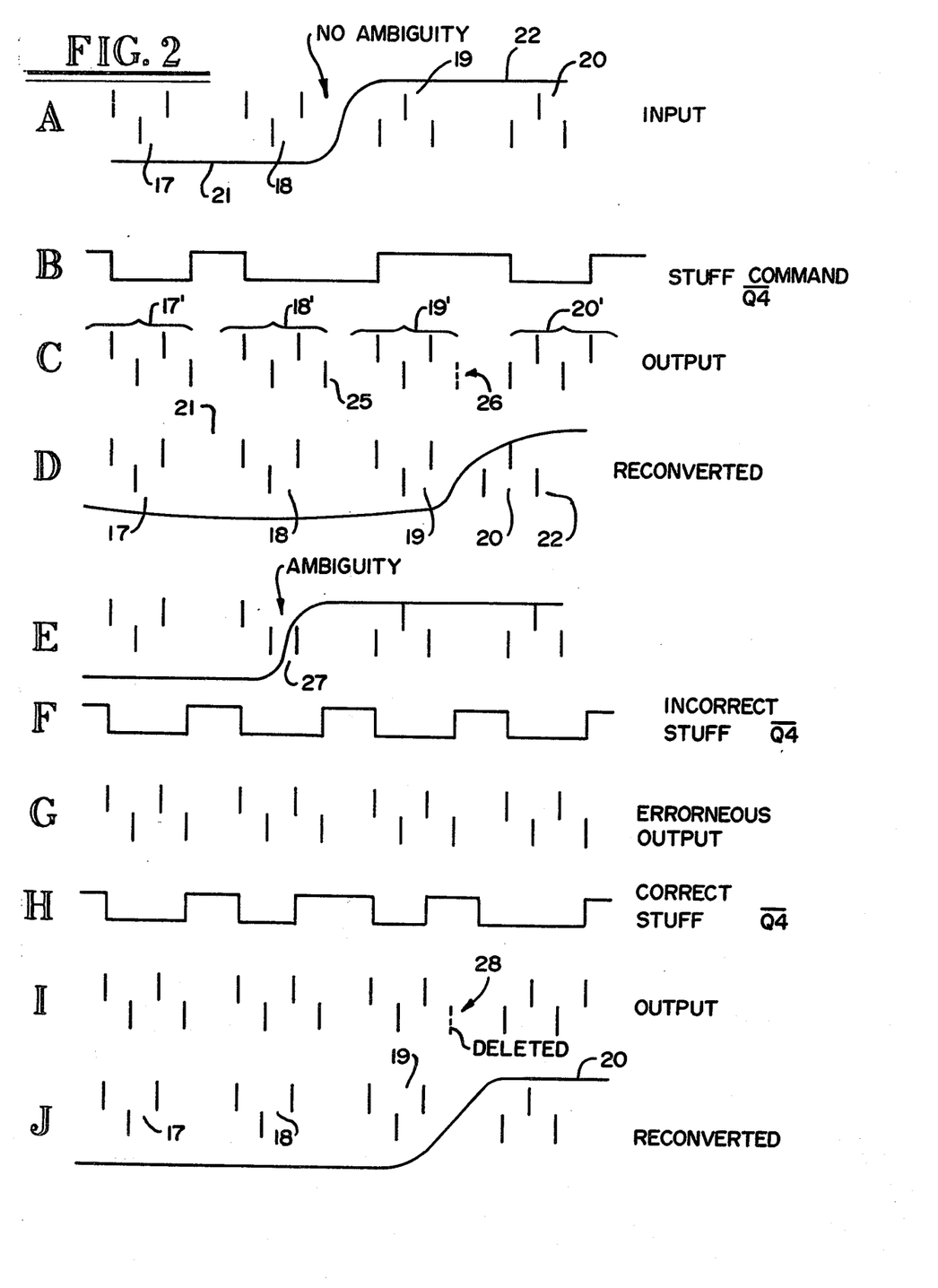
FIGS. 2A–2J are pulse timing diagrams useful in explaining the invention.

FIG. 2A illustrates how the test signal is generated by the test generator 12. It consists of trio sets of pulses which as shown at 17 and 18 consist of a positive pulse followed by a negative pulse followed by a positive pulse; a trio set of the opposite type polarity illustrated at 19 and 20 consists of negative pulses flanking a positive pulse. As is apparent, a group of trio sets of a similar type, for example, positive as illustrated in the case of 17 and 18 will produce a dc component or offset which is illustrated at 21. Similarly, a positive component 22 of an audio frequency will be produced by the trio group 19, 20. In summary, the test signal generator causes a base line shift in the signal which varies in polarity at a selected audio rate.

Test signal generator 12 in addition to providing a test signal of the above character also permits variation in the density of the trio group; i.e., the number of trio sets in a trio group. This results in a variation of the amplitude of the audio component which provides a greater or lesser degree of shifting of the signal base line. Repeaters which are marginal cannot properly regenerate the pulse trio sets when the base line shift exceeds a certain amount. Therefore, by controlling trio pulse set density, and simultaneously observing the amplitude behavior of the audio tone, one can determine the repeater margin.

Unfortunately, in the prior art if the first repeater is marginal, more distant repeaters will not properly receive regenerated pulse trio sets. Therefore, routine testing is usually unsatisfactory for these distant repeaters. In accordance with the present invention, if an extra pulse is added in a nonpulse position such that each trio set becomes a quadruple set, illustrated in FIG. 2C, this restores the normal bipolar polarity constraint of the PCM transmission system, eliminates the base line shift and therefore, marginal repeaters are able to regenerate the pulse quadruples without error. In addition, of course, in systems such as shown in FIG. 1 where VMRs are present a bipolar polarity constraint must be utilized in order to effectively pass the test signal through an office. Reconversion of the quadruple sets to trio sets are shown in FIG. 2D produces the test signal at a selected span.

Referring to FIG. 2B, a stuff command is utilized to add a fourth pulse after every three trio pulses. The signal of FIG. 2C will result which restores the bipolar polarity constraint. Examining the pulse sets of FIG. 2C in detail, it is apparent that when the audio signal changes polarity this automatically provides a bipolar change between 18 and 19. When a fourth pulse is stuffed at 25, trio set 19 is inverted due to the unipolar to bipolar converter which is necessarily present in the conversion process. Deletion of a pulse at 26, however, allows the quadruple set 20' to reflect the same dc offset as trio set 20. This in essence shifts the audio curve 21, 22 between the pulse sets 19 and 20 as is illustrated in FIG. 2D which is the reconverted signal. The x indicates where the additional fourth pulse has been deleted.

As illustrated in FIG. 2E an inherent ambiguity in converting trio pulse sets to quadruple sets and reconverting them is that the test generator 12 may have an audio crossover as shown at 27 at an ambiguous point which is in the middle of a trio set. Assuming that the stuff command as shown in FIg. 2F stuffs an additional pulse after every three pulses the erroneous pulse output of FIG. 2G would result which when the fourth pulse is deleted would have a dc component which has entirely negative such as the audio portion 21 of FIG. 2A. In order to remedy this, FIG. 2H illustrates the correct stuff command which when the ambiguity at point 27 is recognized causes a pulse to be deleted at 28 to restore relative polarity as indicated in FIG. 2J which corresponds to the original signal in FIG. 2A except for a phase shifted audio signal which is shifted one trio group.

Referring particularly to FIG. 1, means for forming quadruple pulse sets out of trio pulse sets is illustrated by the converter 31. The bipolar quadruple signal may now pass through the various offices including the VMR circuits and marginal repeaters. When it is desired to utilize the test signal for testing a reconverter unit 32 deletes the additional pulse again allowing trio sets to be present for testing. The reconverter 32 as will be explained below may be activated either manually, since it is normally located at a manned office, or remotely.

Figure 3:
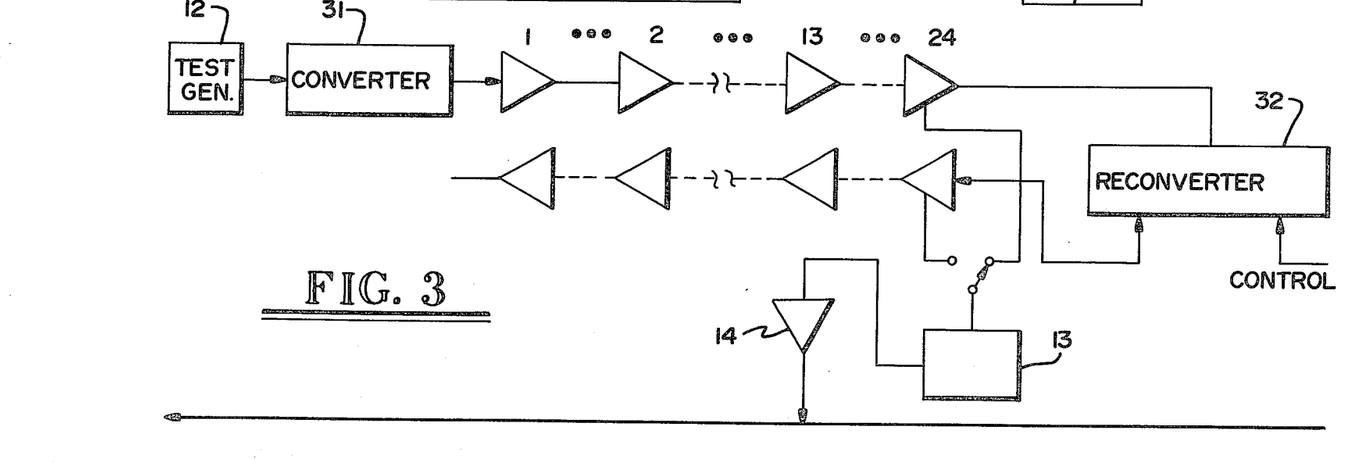
FIG. 3 is a block diagram of another telephone system in which the present invention may be used.

FIG. 3 illustrates a single span configuration with, for example, 24 repeaters where the reconverter 32 is used as a remote loopback for testing any repeater in the incoming office string. Since the test signal has been changed into standard bipolar format it is apparent that it passes transparently through the outgoing repeaters 1 through 24. Also, since it does not have any dc component it is not adversely affected by marginal repeaters.

Figure 4:
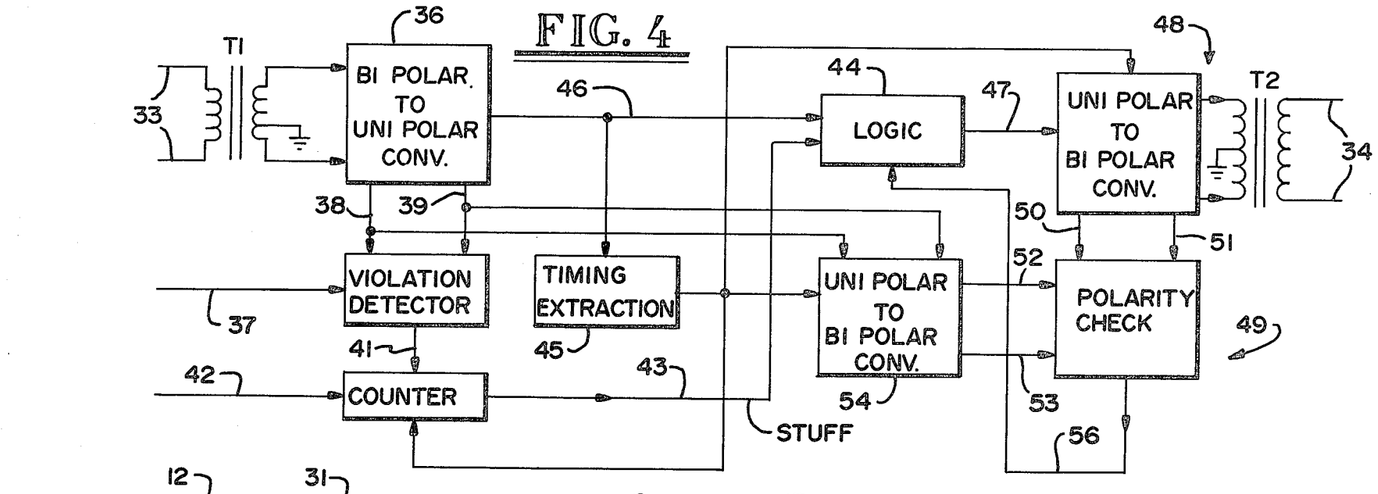
FIG. 4 is a block diagram of a converter circuit for use in the present invention.

FIG. 4 is a simplified block diagram of converter 31 where the input pair 33 to transformer T1 is the output of the test signal generator 12 and output pair 34 from transformer T2 carries the quadruple signal. The input signal at line 33 is in bipolar format and is converted by bipolar to unipolar converter 36 to unipolar format for convenience in processing. Such unipolar format is especially useful when standard art integrated circuits are used. The presence of test signals of the trio set type is detected by a violation detector 37 which senses on input line 38 pulses of one polarity and on line 39 pulses of the opposite polarity. When a trio set is detected, an error pulse is produced on line 41 which starts the counter 42, counts the end of the next trio set, and produces a stuff output command on line 43 which is coupled to a logic unit 44. An extra pulse is therefore added to the trio pulse set on line 46. Quadruple pulse sets therefore occur on line 47 which is coupled to a unipolar to bipolar converter 48 to convert the signal to a bipolar format which is coupled by transformer T2 to the system.

Overall timing is provided by the timing extraction circuit 45 which in general operates by ringing an LC bandpass filter which is well-known in the art. In essence, extraction unit 45 provides timing information from the input signal itself so that all the logic operations that will be performed are synchronized with the input signal. It also provides a timing signal for every possible time slot; depending on the density of the test signal many time slots may be vacant.

The unipolar to bipolar converter 48 is similar to a violation monitor and removal circuit (VMR) as it will restore proper bipolar pulse polarity to any input pulse train that has polarity violations. Converter 48 also provides the means to correct polarity ambiguity in the quadruples which would be produced by other VMR's used to isolate span bipolar pulse violations. Because converter 48 indicates locally what the other distant VMRs would be doing to quadruple polarity integrity, it hence provides a local reference for polarity integrity of quadruples.

As thus far described, a converter circuit would effectively function in the context described if there were no ambiguous crossover of pulse group polarity. However, where an ambiguity such as illustrated in FIGS. 2E through 2J to occur, in order to maintain relative polarity between the trio pulse groups a pulse must be deleted as illustrated in FIG. 2I. Accordingly, a polarity check circuit 49 is provided which compares the polarity of bipolar pulses being produced by converter 48 to the polarity of the incoming signal. Specifically, the output signal of converter 48 is coupled to check unit 49 via lines 50 and 51 and the polarity of the input signal appears on lines 52 and 53. Lines 52 and 53 are coupled to the positive and negative polarity input signals appearing on lines 38 and 39 through a unipolar to bipolar converter 54 which in essence merely provides for proper timing since it is driven by the timing extraction unit 49.

If the polarity check unit 49 indicates a lack of polarity check or in other words an ambiguity in the local VMR output of unit 48, a delete signal is given on line 56 to logic unit 44 to thus restore the relative group polarity as indicated in conjunction with FIGS. 2I and 2J. Of course, converter unit 48, which as discussed above functions as VMR, also indicates what remote VMRs are subsequently going to do with the quadruple.

Figure 5:
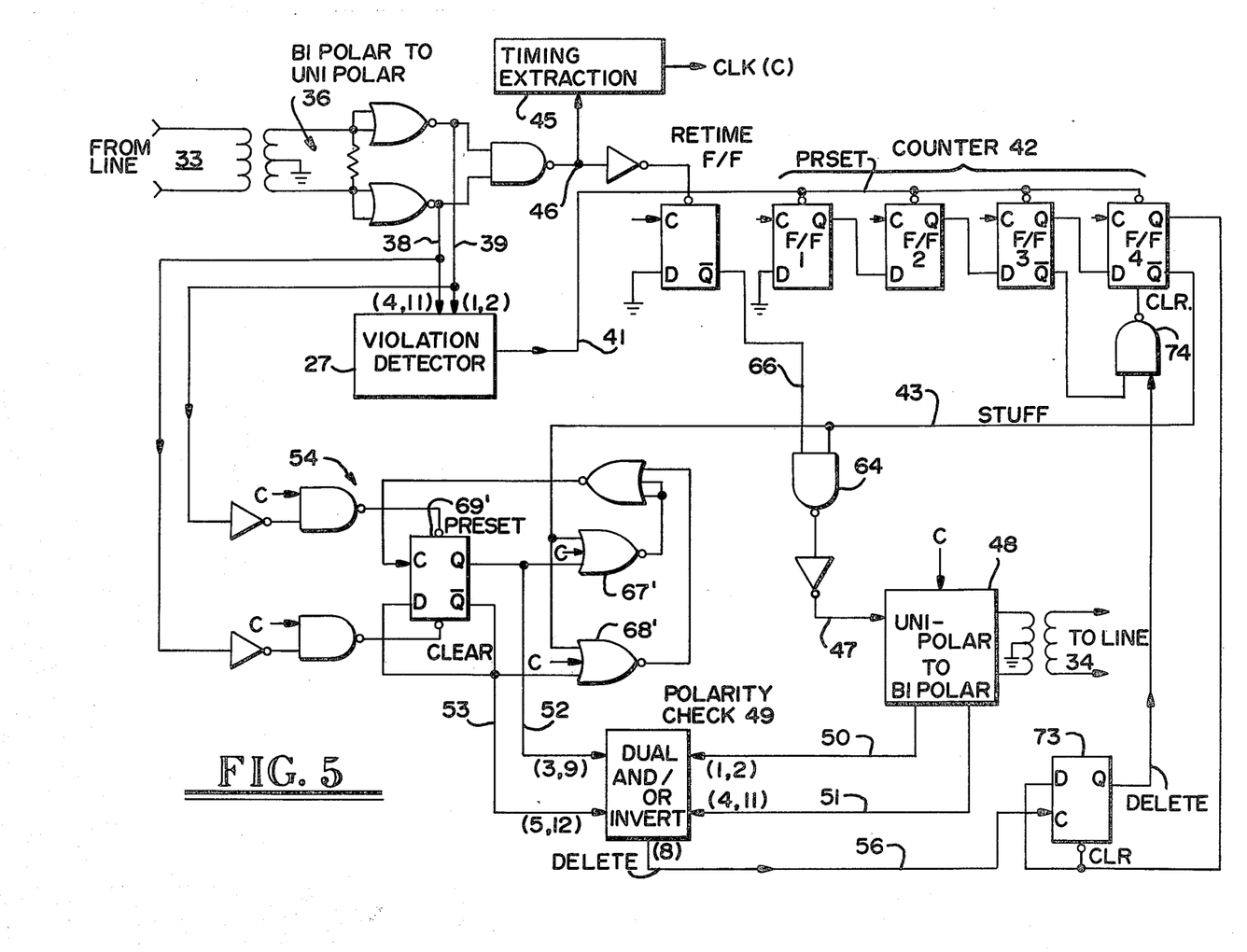
FIG. 5 is a more detailed circuit schematic of FIG. 4.

Referring now to FIG. 5 which illustrates the circuit of FIG. 4 in greater detail, the input pulses one line pair 33 are applied to the bipolar to unipolar converter 36, which is wholly standard in the art, and a train of unipolar pulses occurs on line 46. Timing extraction unit 49 as discussed above provides for a continuous clock for every time slot even though incoming pulses do not occur for every time slot. In normal operation pulses will alternately occur on the lines 38 and 39 to violation detector 27. If this does not occur, then a trio set is present and an error indication will occur on line 41.

Figure 6:
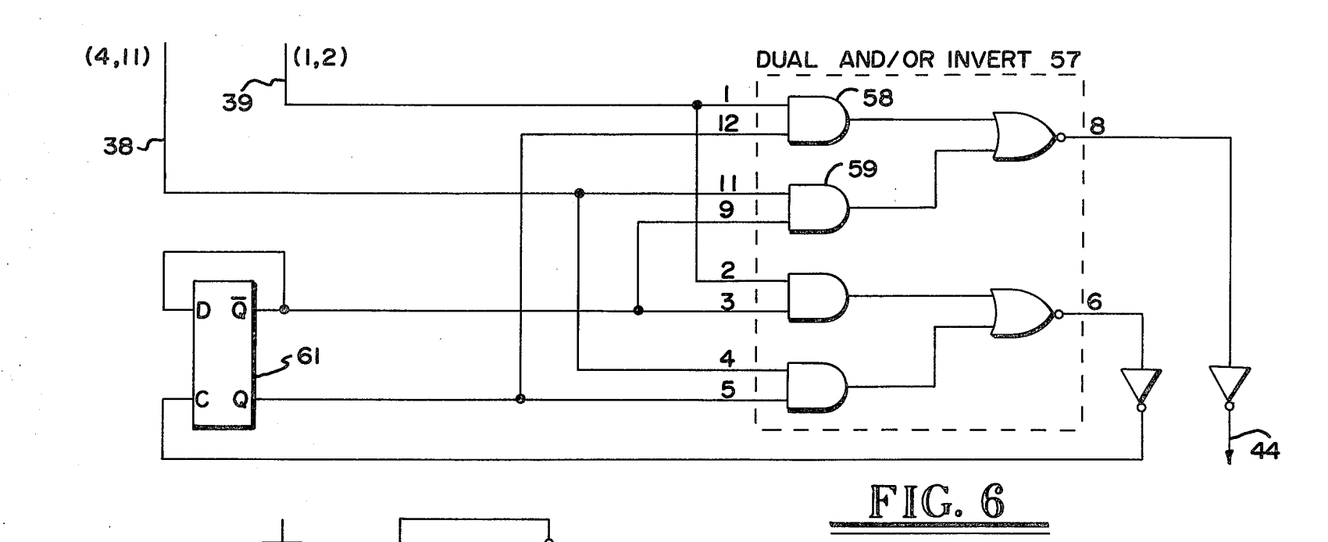
FIG. 6 is a detailed block diagram of a portion of FIG. 5.

Violation detector 27 is shown in greater detail in FIG. 6 and includes as a basic building block a dual AND/OR invert gate 57 which, for example, may be of a standard integrated circuit type 74L51. The various pin numbers of the integrated circuit unit 57 are indicated ', the pins 4, 11 are tied together and to the line 38 and the pins 1, 2 are tied together and to the incoming line 39. From inspection of FIG. 6 it is apparent that as long as the pulses on lines 38 and 39 truly alternate, no output will occur at pin 8 and therefore there is no error indication on line 41. This is because neither of the AND gates 58 and 59 will be closed. The Q and $\overline{Q}$ outputs of 61 provide a memory of the previous pulse and if this was of the opposite type there can be no pulse coincidence. However, if pulses of the same polarity are present, pin 8 will produce an output and an error indication on line 41.

Therefore, referring again to FIG. 5, if an error is indicated on line 41 which indicates that a trio signal is present, counter 42 is preset. The counter is arranged to time off four positions the first three positions occupied by the pulses of the original trio signal and the fourth position will be a normal free pulse position. In other words, the counter essentially indicates when the fourth time slot has occurred so that an additional pulse can be stuffed. Line 47 to converter 48 will now have four pulses in a row or a quadruple instead of the trio.

Figure 7:
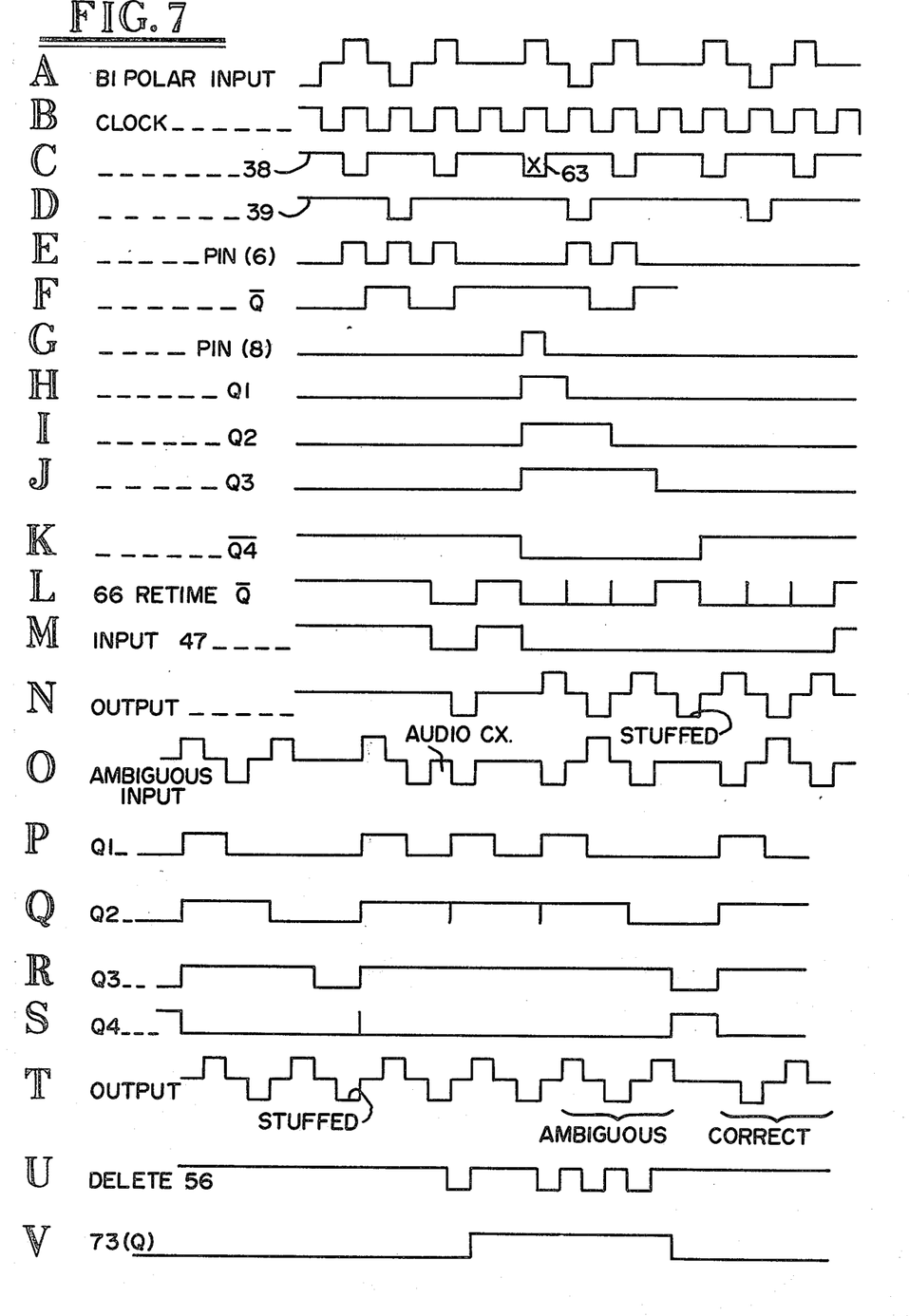
FIG. 7A–7V are timing diagrams useful in understanding the operation of FIG. 5.

FIGS. 7A through N indicate how the foregoing occurs. Referring to FIGS. 5 and 6 in conjunction with FIG. 7 the bipolar input trio pulses from the line pair 33 are indicated in FIG. 7A. The clock pulses (C) of timing extraction unit 49 are indicated in FIG. 7B. Alternating pulses on lines 38, 39 are shown in FIGS. 7C and D where on the line 38 (FIG. 7C) assuming that the first trio starts at pulse 63 the pulse 63 causes an error indication by the violation detector since it is the second positive pulse in a row. FIG. 7E is the pin 6 output of the dual AND/OR invert gate 57 which drives the clock input of flip-flop 61 (FIG. 6) to produce the $\overline{Q}$ output of FIG. 7F. Pulse 63 on line 38 because of the high $\overline{Q}$ output closes AND gate 59 produces a pulse on pin 8 shown in FIG. 7G to cause an output on line 41. This presets all of the flip-flops, F/F1 through F/F4, of counter 42 as indicated in FIGS. 7H through 7K. Thereafter, as these individual flip-flops are clocked the Q1 output of flip-flop 1 goes low after the first time slot causing Q2 of flip-flop 2 to go low after the second and the Q3 of flip-flop 3 to go low after the third time slot and the $\overline{Q}$ output of a flip-flop 4 to go high after the fourth time slot. Therefore, flip-flop 4 produces a stuff command on its $\overline{Q}$ output line 43T. The stuff command is coupled to an AND gate 64 which has as its other input a $\overline{Q}$ on line 66 from the retime flip-flop which is driven from the line 46, the output of bipolar to unipolar converter 36.

The waveform on line 66 is shown in FIG. 7L and as is apparent it essentially shifts the entire unipolar pulse train by a half time slot. Coincidence of $\overline{Q4}$ and $\overline{Q}$ produce the input on line 47 to unipolar to bipolar converter 48 as indicated in FIG. 7M which shows an additional stuffed pulse. Converter 48 produces the bipolar output signal indicated in FIG. 7N which still includes the trio set with the same relative polarity but includes the stuffed pulse to maintain bipolarity. This corresponds to the discussion of FIGS. 2A, B and C where the pulse 25 was stuffed.

However, as indicated in FIG. 7O where there is an ambiguous audio crossover (this corresponds to FIG. 2E) such crossover must be detected and stuffed pulse deleted. In order to accomplish the foregoing, as has been discussed in brief form previously, the bipolar pulses produced by unipolar to bipolar converter 48 on lines 50 and 51 must be compared with the incoming pulses which are coupled to unipolar to bipolar converters 54. Such converter 54 is constrained to exactly follow the incoming bipolar signal including the pulses that violate the bipolar rule as indicated in FIG. 7O.

Figure 8:
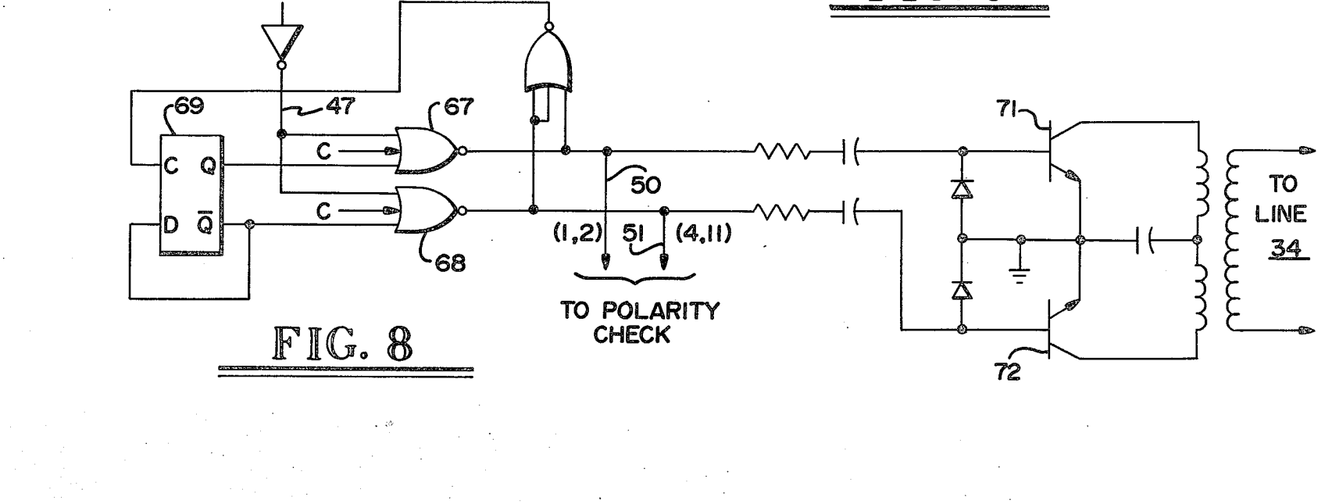
FIG. 8 is a more detailed circuit diagram of a portion of FIG. 5.

Unipolar to bipolar converter 48 is shown in greater detail in FIG. 8 and has as a basic building block two triple input NOR gates 67 and 68 which in addition to the clocking input C of the timing extraction unit 49 and the data input on line 47 also includes a pair of steering inputs from flip-flop 69 which alternately steer the pulses to the output transistors 71 or 72 and the line 34 in a manner well known in the art. The converter clearly removes any violations of its bipolar operating rule. Pulses of one polarity on line 50 and the other on line 51 are coupled to the polarity check unit 49 of FIG. 5. The other pair of inputs to polarity check unit 49 which are being compared with the foregoing are from the converter 54 (FIG. 5) which is almost of the same configuration as the converter of FIG. 8. However, the flip-flop 69' has its preset and clear inputs forced to produce on its output lines 52, 53 pulses which exactly follow the input pulses from line pair 33.

Polarity check unit 49 is actually a dual AND/OR invert gate of the type shown in FIG. 6 with its pin input numbers identically indicated. If there is a lack of comparison, pin 8 produces a delete signal on line 56, as indicated in FIG. 7U. This clock input to flip-flop 73 causes the Q output to go high (FIG. 7V). This output is coupled to AND gate 74 which has as its other input the $\overline{Q}$ output of flip-flop 3 of counter 42. The coincidence of the two inputs clears flip-flop 4 causing $\overline{Q4}$ as indicated in FIG. 7S to go high to thus prevent stuffing of a pulse at this point. Deletion is shown in FIG. 7U. The stuffing pulse of $\overline{Q4}$ as shown in FIG. 7S may be correlated with FIG. 2H. As illustrated in FIG. 7T an additional trio of the wrong polarity is allowed but this, of course, does not affect the final relative polarity.

Thus, in summary, with the converter of present invention the ambiguity in the trio set signal, which is a direct result of the uncertain pulse count in each group as a result of the unsynchronized audio signal control of the polarity crossover region between trio groups, is compensated. Without the present improvement input quadruple groups of arbitrary polarity could be produced. This has been illustrated in FIG. 2G where an ambiguity will in effect clearly erase or prevent any change of the dc component. When the fourth pulse is eliminated the trio sets will all be of the same type.

Figure 9:
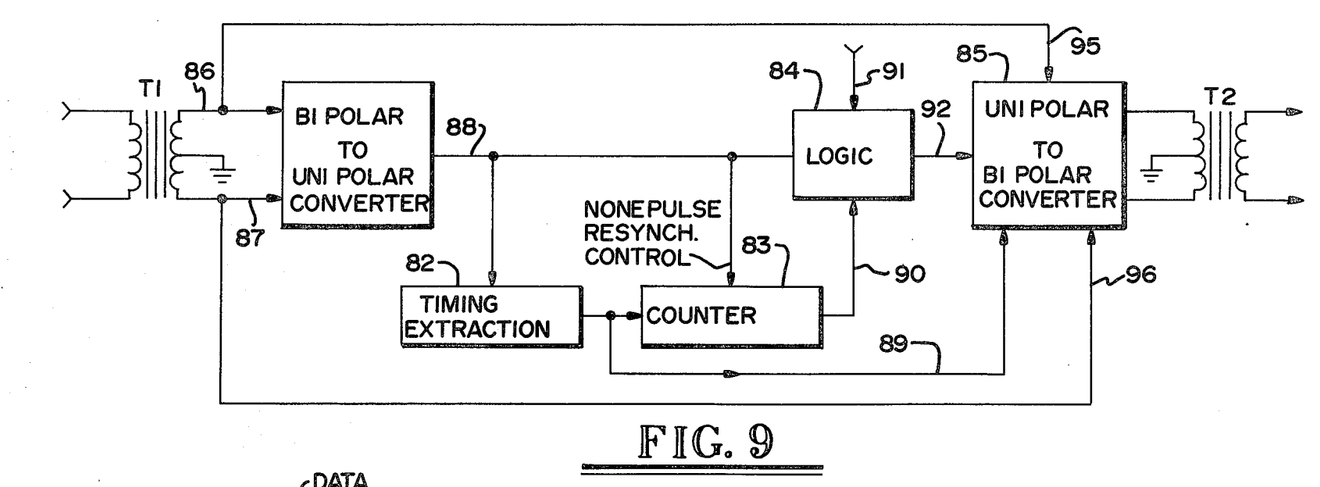
FIG. 9 is a block diagram of a reconverter circuit embodying the present invention.

When it is desired to utilize the quadruple signal for actual testing the reconverter unit 32 must be activated. Such reconverter is shown in detail in FIG. 9 where the quadruple input occurs at the transformer T1 and is converted to unipolar form by bipolar to unipolar converter 81. Counter 83 counts each quadruple pulse set and produces an output pulse coincidence on line 90 coincident with the fourth pulse of each quadruple set. The pulse line 90 forces the logic 84 to delete the fourth pulse of every quadruple set which restores the trio pulse set. The unipolar output on line 92 then converted to bipolar form by unipolar to bipolar converter 85. It is then available in the output of transformer T2 for transmission on the span to be tested. Normal fault location is now possible. Line 91 provides for control to actuate the converter.

Lines 95 and 96 extending from the input lines 86 and 87 respectively provide group polarity control of the output of converter 85. In fact, the converter circuit 85 is substantially identical to the equivalent portion of converter 54 of FIG. 5. That is, the preset and clear inputs of the associated flip-flop are actually the lines 95 and 96.

Figure 10:
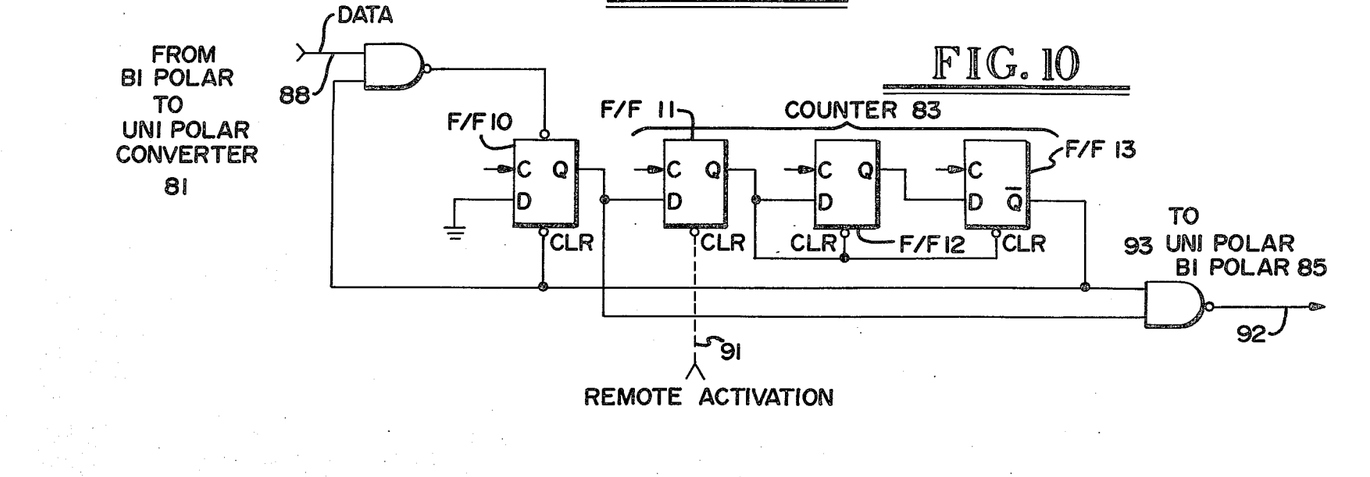
FIG. 10 is a more detailed diagram of a portion of FIG. 9.

FIG. 10 illustrates counter 83 and associated logic.

Figure 11:
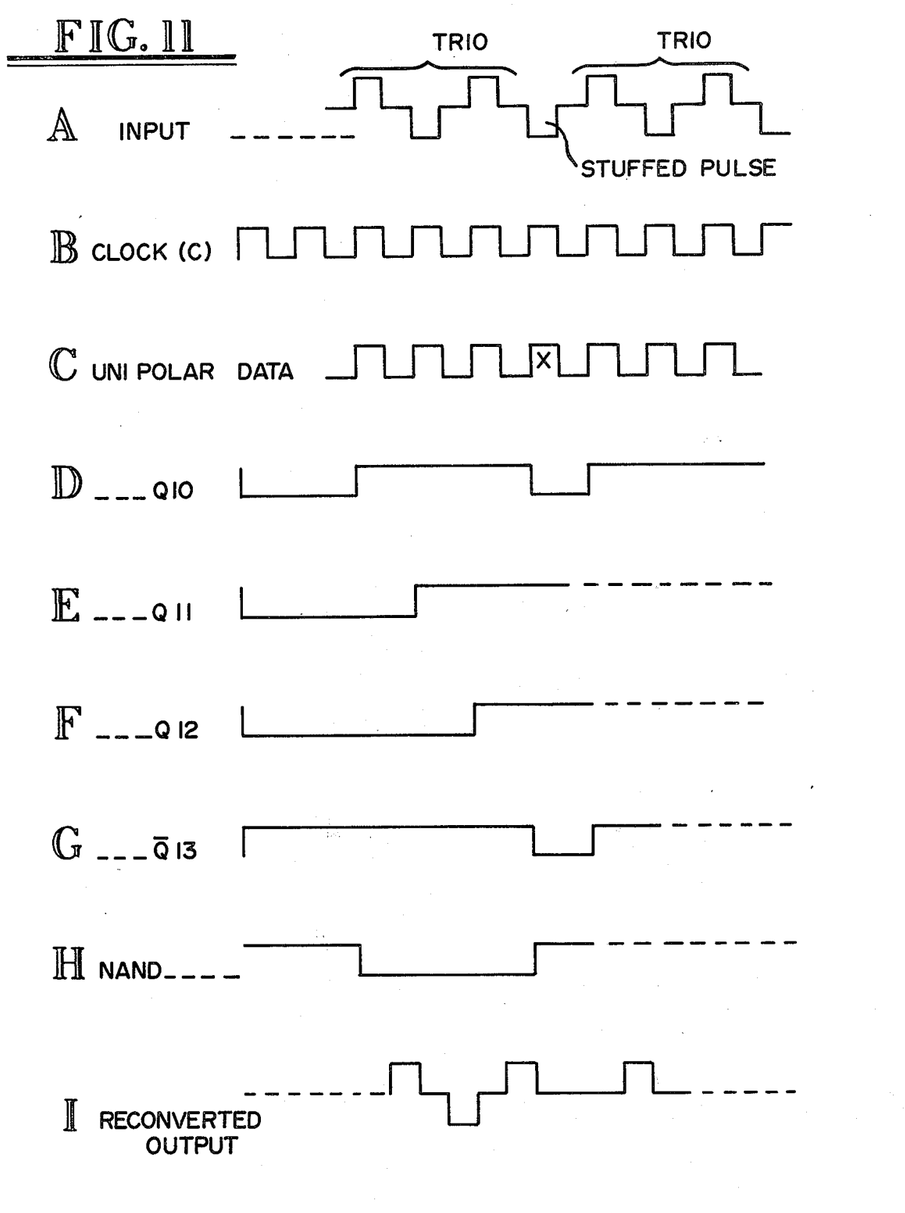

Referring now also to FIGs. 10 and 11, FIG. 11A indicates the incoming trio in quadruple form with the stuffed pulse which forms the quadruple. Conversion to unipolar form on line 88 is illustrated in FIG. 11C. The preset input of flip-flop 10 causes it Q10 output to go high at the beginning of each trio pulse set. (FIG. 11D). Counter 83 senses the first data pulse, counts to three, and removes the fourth pulse. This is true even if there is no fourth pulse present. A reset occurs at the end of the third pulse by Q of flip-flop 13. As illustrated in FIG. 11G, the Q output of flip-flop 13 goes high at the end of the third time slot preventing the NAND gate 93 from producing any pulse on the fourth time slot. Thus, a trio set as illustrated in FIG. 11I is produced.

The reconverter circuit can choose any pulse at random initially as the first pulse of a quadruple set.

However, the first and subsequent non-pulse time slots resynchronize converter 83 so that quadruple groups are time located for unambiguous destuffing. It is also obvious that the converter of the present invention can be left on line at all times since normal bipolar signals that is, nontest terminal signals carrying voice, etc. do not have violations. Therefore, there is never an error detection and thus no pulses are stuffed. Consequentially input signals are passed unaltered to the output.

What is claimed is:

1. In a pulse code modulation (PCM) type communications system having repeater stations the PCM signal normally being in bipolar format and where such repeater stations may be tested by a plurality of test signals having relatively low frequencies compared to the PCM rate, such test signals being formed by trio sets which consist of a PCM pulse of one polarity between two pulses of the opposite polarity said pulses occupying three contiguous time slots of said PCM system, a plurality of trio sets of one type forming a trio group, sequential trio groups of opposite types providing a base line shift in the test signal which varies in polarity at a selected one of said low frequencies; said system including means for converting said trio sets to quadruple sets which have four pulses occupying four contiguous time slots for providing a signal which is sequentially bipolar with no dc offset.

2. A communications system as in claim 1 where said converting means includes trio set detecting means, stuffing means responsive to the detection of a trio set by said detecting means for stuffing a fourth pulse to provide said quadruple sets, and delete means for deleting said fourth pulse in response to an ambiguity in a trio set.

3. A communications system as in claim 1 including reconverter means responsive to an external command for reconverting said quadruple sets to trio sets.

4. A communications system as in claim 3 where said reconverter means is connected between an outgoing and incoming line from a central office to thereby provide a remote loopback.

5. A communications system as in claim 1 where said converting means includes trio set detecting means and stuffing means responsive to the detection of a trio set by said detecting means for stuffing a fourth pulse to provide said quadruple sets.

* * * * *